2,117,277

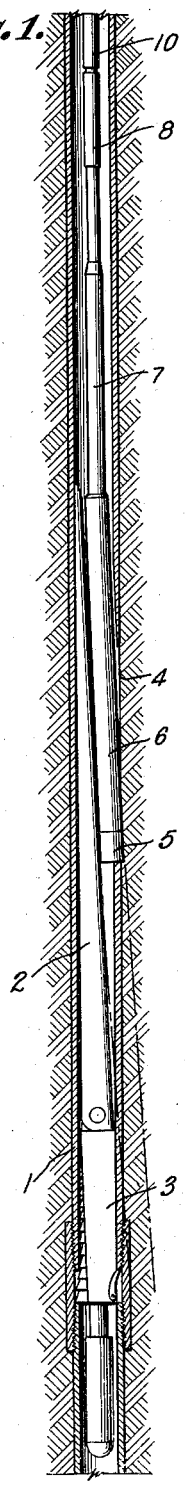
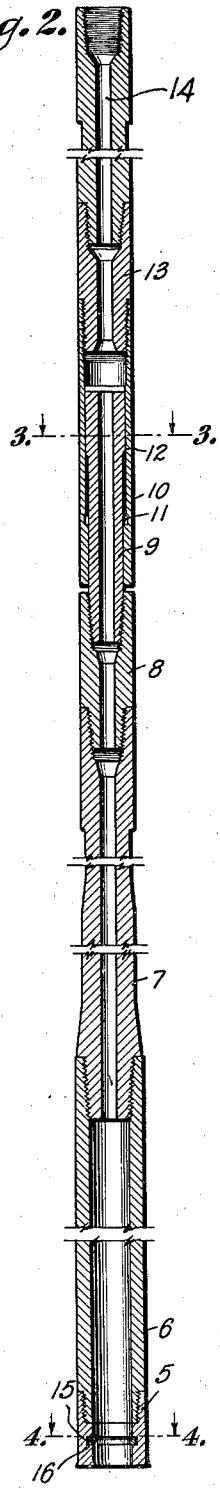
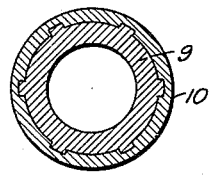
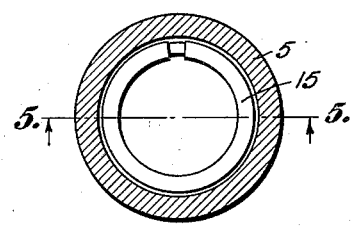
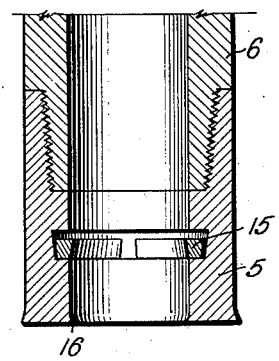
May 17, 1938. J. G. DYER 2,117,277
METHOD OF PERFORATING CASINGS IN WELLS
Filed Jan. 18, 1937
INVENTOR
Joseph G. Dyer
BY
ATTORNEY Patented May 17, 1938

UNITED STATES PATENT OFFICE 2,117,277

METHOD OF PERFORATING CASINGS IN WELLS

Joseph G. Dyer, Ponca City, Okla., assignor to Continental Oil Company, Ponca City, Okla., a corporation of Delaware Application January 18, 1937, Serial No. 121,040

2 Claims. (Cl. 255—1)

My invention relates to a well casing perforating device and more particularly to a cutting device to be used in connection with the cutting of windows in the casing used in the drilling of wells.

One of the most difficult operations in the drilling of oil wells has been the milling out or otherwise cutting an opening in the wall of the steel casing in a well. The art of sidetracking an uncased drill hole has been so much improved that this work is now done with little or no difficulty. Frequently, it becomes necessary to sidetrack a drill hole which has been cased. The normal procedure has been to seat what is known as a whipstock which is merely a deflecting tool. There are a number of whipstocks known to the art and these form no part of my invention. After the whipstock has been set, the usual procedure is to run a milling tool, secured to the bottom of the drill pipe, in an attempt to cut away a section of the casing immediately opposite the face of the whipstock. Milling tools have been improved to such a point that they readily cut the casing and the cutting of the first half or upper portion of the window is usually accomplished without great difficulty. The operation becomes uncertain and difficult when the center line of the milling tool reaches the center line of the casing. At this point, there is nothing to hold the milling tool on the casing in cutting position and it will tend to follow the line of least resistance and jump out into the formation. In other words, as soon as the opening in the casing is sufficiently large to permit the passage of the milling tool therethrough, the tool, following the line of least resistance, will pass out of the window instead of continuing to cut the tough steel of the casing. This tends to cause "twist-offs" and, at best, an unsatisfactory window, since the angle of deviation at this step-off point will be too acute.

One object of my invention is to provide an apparatus and method of cutting a satisfactory window in a well casing when it is desired to side track a cased drill hole.

Another object of my invention is to provide a cutting head which will enable a continuous circulation of oil well drilling fluid to occur while the window cutting operation is proceeding.

Another object of my invention is to provide a tool for cutting a window in a casing in which the sliver of casing will be withdrawn from the well with the tool.

Other and further objects of my invention will appear from the following description.

In the accompanying drawing which forms part of the instant specification and are to be read in conjunction therewith and in which like reference numerals are used to indicate like parts in the various views;

Figure 1 is a sectional elevation of a portion of a well showing a drill hole with a whipstock in place and my cutting head assembly during the operation and after having cut a section of the window.

Figure 2 is a sectional view taken through a portion of my sidetracking or window cutting unit.

Figure 3 is a sectional view taken on a line 3—3 of Figure 2.

Figure 4 is a sectional view taken on a line 4—4 of Figure 2.

Figure 5 is a sectional view taken on a line 5—5 of Figure 4.

Referring now to the drawing, in the well casing 1 is secured a whipstock 2 supported by any suitable supporting means 3, as is well known in the art. The whipstock 2 is used in connection with the milling tool as is conventional practice until an opening 4 has been made in the well casing 1, it being understood that the milling operation is not conducted to a point at which the center line, that is, the axis of the milling tool, has passed the casing wall. All that is necessary is to mill until an opening in the casing opposite and somewhat below the top of the whipstock has been made. When this is done, the milling tool is removed and the tool assembly shown in detail in Figure 2 is run into the hole. The assembly comprises a cutting head 5 shown in greater detail in Figure 5. This cutting head is made of the highest quality steel which can be purchased for the purpose. The cutting head is secured to a hollow section 6 of extremely heavy walled pipe. This section will be sufficiently long to accommodate the section of casing to be cut out since it acts as a receiver for the "sliver" of the casing which is cut by the cutting tool. The pipe is in turn secured to a drill collar 7 which may be of any desired length. Secured to the drill collar is a "bumper" or "jar" 8 to which is secured bushing 9 over which sleeve 10 is adapted to slide and the sleeve 10 is provided with an internal shoulder 11 attached to shoulder 12 of the bushing 9. The jar assembly just described is conventional and is known to those skilled in the art. One feature to which attention is directed is the fact that the jars are hollow.

Secured to the sleeve 10 and extending thereabove are sufficient drill collars 13, in order to obtain an abnormal amount of weight directly above the cutting tool. The drill collars may be replaced by lengths of extra heavy pipe such as drill pipe or the like in order to achieve the desired weight. Above the weight section there will be the regular drill pipe 14 which will extend upwardly to the derrick floor in the usual manner.

In use, the cutting assembly will be lowered to the point of deflection enabling the cutting head to rest against the whipstock on one side and the casing on the other. Then the drill pipe is alternately lifted and dropped at the jar, the distance between shoulders 11 and 12 providing amplitude of movement. This force will drive the cutting head downwardly through the section of pipe as shown by the dotted line in Figure 1, cutting out the window. It will be observed that the jar has been made hollow and that the entire assembly is such that drilling fluid may be circulated through it to the cutting tool.

With my method of cutting the window, the sliver will be retained in the hollow section 6. The cutting head 5 is provided internally with a spring ring 15 which is adapted to retain the sliver therewithin, enabling it to act as a guide and, at the same time, permitting its withdrawal from the well. After the cutting has proceeded to the desired point, the sliver will be cut off by the internal cutting edge 16 of the cutting head 5.

The procedure described above is used in connection with an extremely thick walled casing. It is to be understood of course that with thin wall casings or even with thick wall casings, the milling operation may be dispensed with and my cutting assembly may be used directly after setting the whipstock and the window cut from top to bottom with my new tool.

It will be observed that I have accomplished the objects of my invention and that I have provided a handy assembly for cutting a window in a well casing when it is desired to sidetrack the cased hole. It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of perforating a well casing including the steps of positioning a whipstock within said casing, milling a portion of said casing to form an opening, positioning an annular cutting head in said partially formed opening, jarring said cutting head to complete said opening, and continuously circulating an oil well fluid through said cutting means during said perforating operation.

2. A method of perforating a well casing, including the step of positioning a whipstock within said casing, positioning an annular cutting head in said casing in proximity to said whipstock, jarring said cutting head and continuously circulating an oil well fluid through said cutting head during said perforating operation.

JOSEPH G. DYER.